2 Sheets—Sheet 1.
W. S. SHIPE.
Assignor to O. S. GARRETSON.
STOVE PIPE.
No. 11,005. Reissued May 28, 1889.
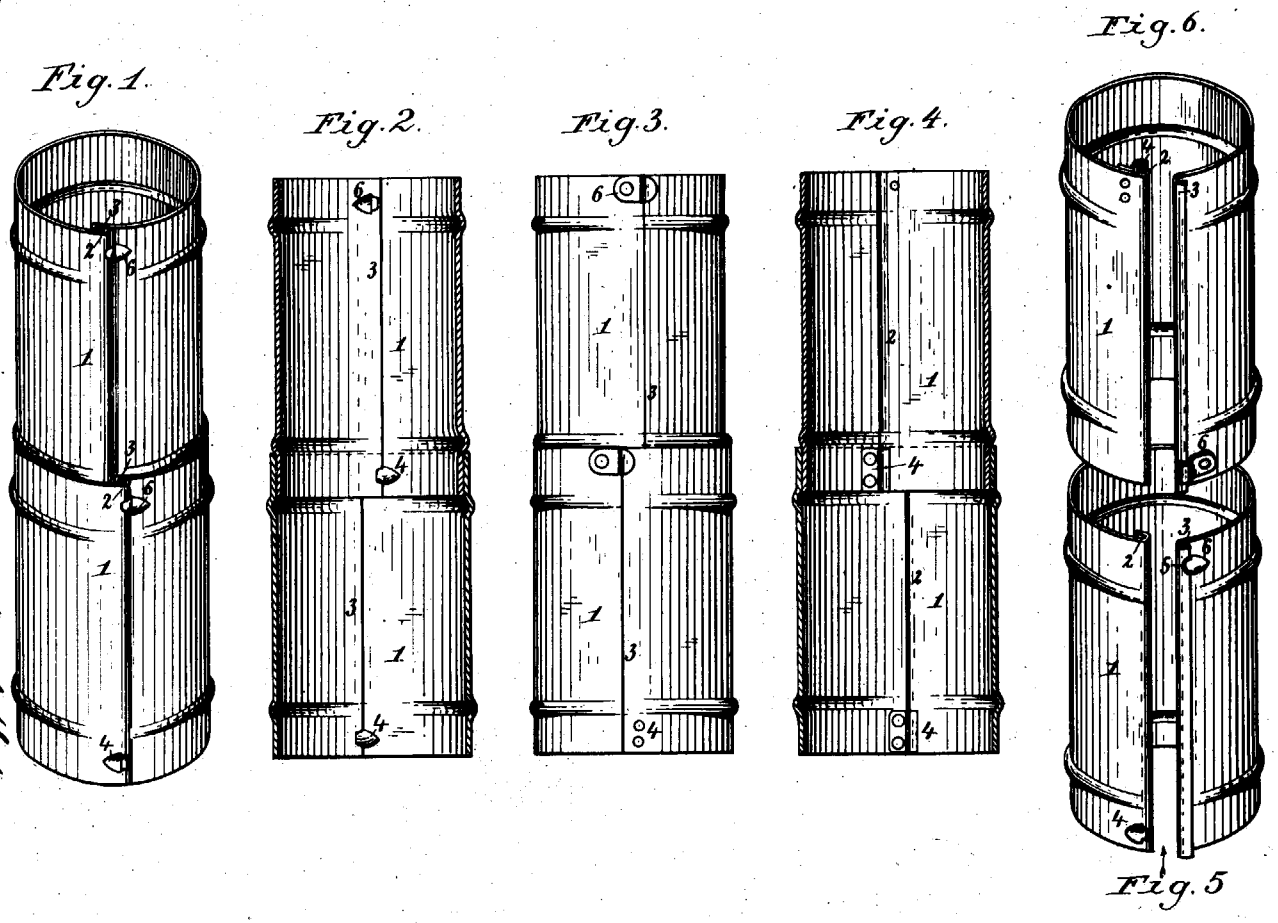
Witnesses:
Geo. J. Buchheit Jr.
Chas. J. Buchheit.
Walter S. Shipe Inventor
By Wilhelm Bonner.
Attorney.

2 Sheets—Sheet 2.

W. S. SHIPE.

Assignor to O. S. GARRETSON.

STOVE PIPE.

No. 11,005. Reissued May 28, 1889.

Chas. J. Buchheit
Geo. J. Buchheit Jr. } Witnesses.

Walter S. Shipe Inventor.
By Wilhelm & Bonner
Attorneys.

UNITED STATES PATENT OFFICE.

WALTER S. SHIPE, OF MINERVA, OHIO, ASSIGNOR TO OLIVER S. GARRETSON, OF BUFFALO, NEW YORK.

STOVE-PIPE.

SPECIFICATION forming part of Reissued Letters Patent No. 11,005, dated May 28, 1889.

Original No. 366,515, dated July 12, 1887. Application for reissue filed January 27, 1888. Serial No. 262,183.

*To all whom it may concern:*

Be it known that I, WALTER SCOTT SHIPE, a citizen of the United States, and a resident of Minerva, in the county of Stark and State of Ohio, have invented certain new and useful Improvements in Stove-Pipes; and I do hereby declare that the following is a full, clear, and exact description of the invention, which will enable others skilled in the art to which it appertains to make and use the same, reference being had to the accompanying drawings, which form a part of this specification, and in which—

Figure 7:
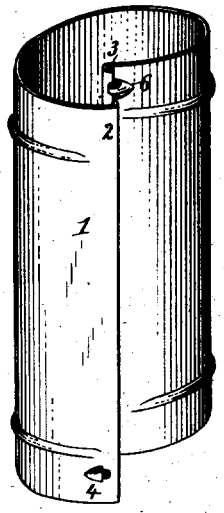
Figure 8:
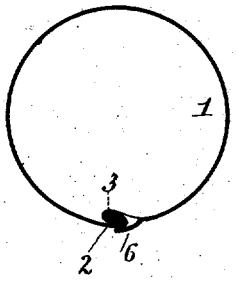
Figure 9:
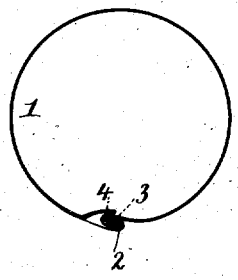

Figure 1 is a perspective view of two lengths of my improved stove-pipe, showing the joint. Fig. 2 is a vertical longitudinal sectional view of the same, looking toward the seam. Fig. 3 is a view of two lengths of pipe of a slightly-modified form. Fig. 4 is a longitudinal sectional view of the same, looking toward the seam. Fig. 5 is a view of the length of pipe with its edges disconnected. Fig. 6 is a similar view of the modified form of pipe. Fig. 7 is a perspective view of a section of my improved stove-pipe, showing the interlocking flanges moved lengthwise out of their normal position. Figs. 8 and 9 are cross-sections through the section near the ends thereof.

Similar numerals of reference indicate corresponding parts in all the figures.

My invention has relation to that class of stove-pipes in which the seams of the lengths may be disengaged; and it consists in the improved construction and combination of parts of such a stove-pipe, as hereinafter more fully described and claimed.

In the accompanying drawings, the numerals 1 indicate the lengths of pipe, which are formed by rectangular sheets of metal having their side or longitudinal edges respectively bent or folded inward and outward to form flanges 2 and 3, the inwardly-bent flange of each sheet hooking over the outwardly-bent flange and forming a seam.

Near the ends of each section of pipe are the inwardly and outwardly extending lips or projections, 4 and 6, one of which is nearer the end of the section than the other. One of these lips is near one end of one of said flanges and the other lip is near the opposite end of the other flange, said lips being upon opposite ends of the section and struck up from the metal, so that each lip forms an abutment near the edge of the flange. As each end of the sheet of which the pipe, is composed is thus provided with a lip, it will be seen that if the flanges can be hooked into each other the lip will prevent their coming apart. This could be done by forming the lips after the flanges have been hooked together; but as it is desirable to sell the sections complete in the flat, so that they can be shipped and stored in as compact a form as possible, it would not be desirable to thus form the lip after the sections are put together. By drawing the oppositely-turned flanges on the edges of the sheet in opposite directions lengthwise of the flanges and out of their normal position until the ends of the flanges will not be obstructed by the lips, as represented in Fig. 7, the intermediate portions of the flanges can be hooked together, when, by forcing the flanges endwise upon each other in the opposite direction or back into their original position, the flanges will slip in between each lip and its flange, thus making a complete pipe-section, and which it will be impossible to unloosen without sliding the flanges lengthwise until they pass the lips at each end. By placing one lip farther from the end than the other the pipe-section can be secured at that end, while the rest of the flanges are out of engagement, so that while the other ends of the flanges are being secured to the end those first secured cannot come apart. When these lips are struck up from the sheet metal, they can be made so as to project above and over the flange by cutting a nick or notch in the edge of the flange, as shown at 5 in Fig. 5. This construction will make a more secure joint than were the lip only as high as the flange and did not project over it. Instead of forming these lips by being struck up from the metal, they can be formed by separate pieces, as shown in Figs. 3, 4, and 6, and be riveted to the respective ends of the sheet or section. After the sections have been formed, as above described, they can be secured together to form pipe in the ordinary manner, one end of the section being slightly crimped or tapered, as in the ordinary pipe, to facilitate the fastening of the ends of the sections within each other.

Having thus described my invention, I claim and desire to secure by Letters Patent of the United States—

1. A stove-pipe section consisting of a sheet of metal having its longitudinal edges provided with oppositely-turned interlocking flanges and provided near one of its ends with a lip which engages with one of said flanges and prevents the interlocking flanges from being engaged and disengaged in their normal position, but permits the engagement and disengagement of said flanges when displaced lengthwise and the engagement with and disengagement from said lip by a lengthwise movement of the interlocked flanges upon each other, substantially as set forth.

2. A stove-pipe section consisting of a sheet of metal having its longitudinal edges provided with oppositely-turned interlocking flanges and provided near its end with an internally-projecting lip arranged in rear of the inwardly-turned flange and bearing against the outwardly-turned flange, substantially as set forth.

3. A stove-pipe section consisting of a sheet of metal having its longitudinal edges provided with oppositely-turned interlocking flanges and provided near its end with an externally-projecting lip arranged in rear of the outwardly-turned flange and bearing against the inwardly-turned flange, substantially as set forth.

4. A stove-pipe section consisting of a sheet of metal having two of its opposite edges provided with oppositely-turned flanges and having a lip near one end of each of said flanges, said lips being upon opposite ends of the section and extending, respectively, inwardly and outwardly, substantially as set forth.

5. A stove-pipe section consisting of a sheet of metal having two of its opposite edges provided with oppositely-turned flanges and a lip near one end of each of said flanges, said lips extending, respectively, inwardly and outwardly, being upon opposite ends of said sections and struck up from the sheet of metal and projecting over and above their respective flanges, and the flanges being provided with a nick or notch at one end, substantially as set forth.

6. A stove-pipe section consisting of a sheet of metal having two of its opposite edges provided with oppositely-turned flanges and a lip near one end of each of said flanges, said lips being upon opposite ends of said section and one of them being nearer the end of the section than the other, substantially as set forth.

Witness my hand this 14th day of January, 1888.

WALTER S. SHIPE.

Witnesses:
FRED. C. GEYER,
JNO. J. BONNER.